3,235,492
COMPOSITION FOR AND METHOD OF REMOVING IMPURITIES FROM WATER
Robert Andresen, Raritan, and George R. Bell, Martinsville, N.J., assignors to Johns-Manville Corporation, New York, N.Y., a corporation of New York
Filed Mar. 25, 1963, Ser. No. 267,670
14 Claims. (Cl. 210—52)

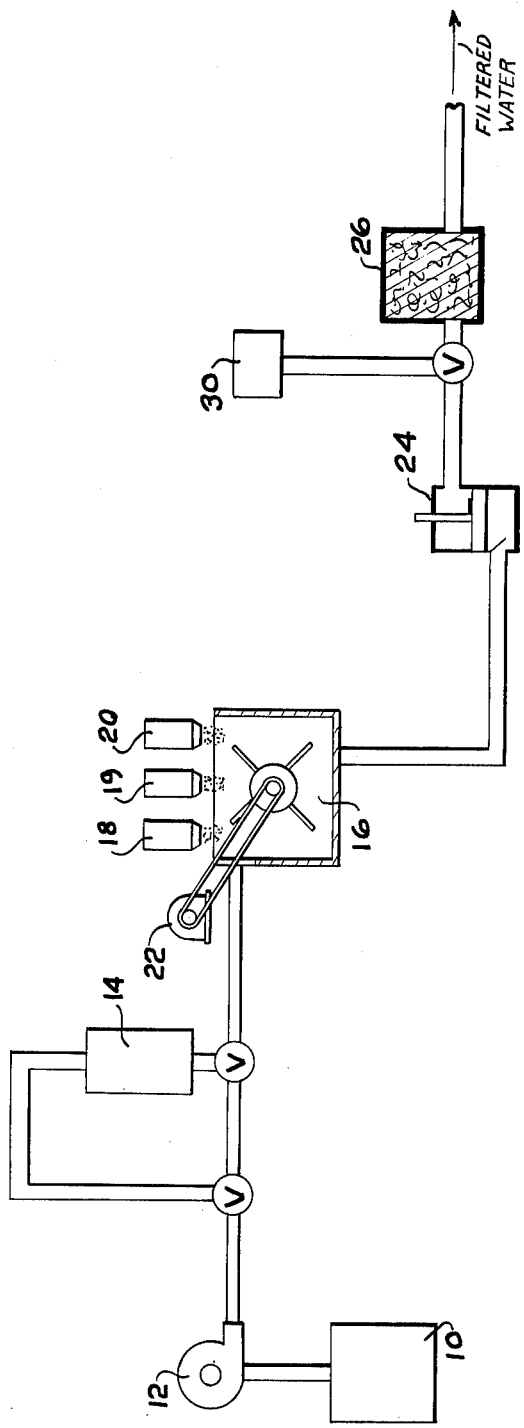

FIELD OF INVENTION

This invention relates to an improved method for removing colloidal and/or finely divided insoluble materials from liquid, and especially concerns the removal of organic color matter and finely divided turbidity in water supplies and waste water streams. More particularly, this invention relates to the filtration, clarification and purification of water to remove impurities therefrom and to the novel method to effect the same. Still more specifically, this invention relates to a method of filtration with filter aids which includes a preconditioning step to reduce the suspensoids to a clarifiable condition and to render them filterable by attachment to rigid filter aid particles.

As generally understood, filtration is the removal of suspended particles from a liquid by forcing the liquid under a pressure differential through a filter medium. Slow sand filters were the first water filter structures devised to accomplish this on a large scale and in many ways simulated percolation through naturally occurring sand such as that of the banks or galleries along the edges of rivers or other water sources. These structures, however, have several disadvantages including such low capacity that large areas and expensive construction are required, and more significantly, the inability to handle many types of contamination found in water supplies.

As the technology advanced, much coarser sand was employed acting largely as straining devices, and these have been termed "rapid sand filters." An important aspect of this technique is that these filters have little inherent clarifying capacity in themselves and the clarification must be provided by prior treatment of the water with appropriate chemicals and processes. That is, the suspended matter therein was treated to collect or coalesce into sufficiently large agglomerates so as to settle out and be substantially removed in advance of the rapid sand filter. The treatment processes which cause coalescence as thus described are called "pretreatment" among water works engineers and operators. Such a process characteristically includes an array of equipment such as chemical feeders, flash mixing basins, slow mixing chambers in which the agglomerates form, sedimentation basins to remove the agglomerates, and finally the filters themselves, which take out the remaining larger sized contaminants. The material thus entrapped in the sand, is considered by some to lend itself to the clarification mechanism of the sand filter, but almost never is unpretreated water filtered through rapid sand filters if high quality filtered water is desired. It is commonly understood in water works practice that the term "sand filter plant" includes the pretreatment works which are substantially larger and more expensive than the sand filter structures themselves. This technique is more fully explained in "Betz Handbook of Industrial Water Conditioning."

Because the size and cost of the foregoing processes make them unobtainable to most water users, smaller communities and industries have had certain difficulties associated with their water supplies. Of the many impurities thus encountered, among the most prominent and most trouble-causing have been turbidity and color.

Turbidity may be defined as the lack of clearness in water but should not be confused with color, for water may be dark in color but nevertheless clear and not turbid. This lack of clearness is primarily due to suspended matter in a finely divided state and may be the result of slit, organic matter, microscopic organisms and similar materials. Consequently, turbidity is the measurement of the optical obstruction of light passing through the water caused by the suspended particles, rather than in any terms of weight concentration. Color of water on the other hand, is exactly what the word means—the light characteristics of water as determined by visual observation, and generally, is imparted to water by the presence of complex organic bodies colloidal in nature or possibly in true solution.

Recently, innovations have been put forth purporting to improve rapid sand filter color and turbidity-removal performance when in reality they are improvements to the pretreatment process which precedes the actual filter operation. The reason for this becomes apparent when it is understood that any appreciable amount of residue not removed by settling from the filter influent will quickly tend to clog the filter, producing impractical head losses in a relatively short time.

Specifically, approaches have been made by various individuals which concentrate on producing the floc or coagulant of the material to be removed by the addition of a flocculating agent or coagulation aid. Such agents may be represented by the high molecular weight polyacrylamides and are used as additaments to the aqueous medium. Representative of such materials and similar agents are those disclosed in U.S. Letters Patent Nos. 2,831,841 and 2,909,508 to Jones and 2,995,512 to Weidner et al.

Further endeavors, as illustrated by U.S. Patents Nos. 2,817,645 to Weisgerber and 2,862,880 to Clemens, approach the problem on the basis that the turbidity may be classified as negatively charged particles. Accordingly, it was devised that the water be treated with an inorganic coagulating solution of a positive charge, such as aluminum sulfate in combination with the flocculating agent, e.g., polyamide compound, whereby the advantages of both could be utilized.

However, even these processes, while they permit the removal of a goodly portion of the suspended particles by more rapid sedimentation have had particular disadvantages, in that they must combine the techniques of both filtration and sedimentation. Filtration itself is not sufficient, for while the coagulated larger particles can be filtered without sacrificing filtration speed, the flexible gel-like masses of the floc with enmeshed suspended particles soon clog or gum-up the filter, necessitating frequent undesirable and uneconomical shut downs. Further, in many cases the use of the sedimentation process with its accompanying need for expensive apparatus and long detention time has increased the cost of the process beyond permissible limits.

One other practice merits notation and involves the addition of small amounts of coagulant aid and alum to relatively clear raw water supplies, thoroughly mixing, and then filtering without either forming a discrete floc or settling on relatively coarse rapid sand filters containing an upper layer of anthracite. It is postulated that the grains of the filter medium, sand and/or anthracite, become coated and that the coated surfaces thus activated cause the clarification.

Thus, this portion of the prior art to date, has dealt primarily with improvements to the floc formation and sedimentation steps, to reduce the load on the filters and also to permit more open, larger grained sand and higher filtration rates as a means of reducing costs.

While the above sums up that which might be termed the traditional approach to water filtration, technologies long used by other industries are presently being adapted to water clarification. Specifically, the principle of filter aid filtration which has long demonstrated many advantages in other fields has shown significant economic and technological advances in water clarification.

It is important to undertand that these economics result from the simplicity of the process whereby the requirements for large and expensive structures to provide for long floc formation and settling periods are reduced.

As noted above, filtration theory calls for the liquid filtrate to pass through the openings of a filter medium, which may be a septum of cloth, screen, etc., while the suspended particles are to remain behind. However, in reality, the finer suspended particles also pass with the liquid as the coarse openings of the medium are unable to retain them, while the larger particles do become filtered and remain upon the medium, soon to clog the openings and eventually slow down or completely stop the flow of liquid through the filter.

These difficulties have been for the most part overcome by adding a small amount of filter aid to the liquid to be filtered. By so doing, the filter and functions to form continuously a porous cake upon the filtering surface and in actuality to entrap impurities by various mechanisms, such as by surrounding each particle of slimy, gummy or squashy solid to prevent the blinding over of the filter surface, The properties of the filter aid, e.g., porosity, fineness, diversity of shape, incompressibility, etc., make it unique for this purpose. A particularly important feature of filter aid filtration is that the pores in the surface of the filter aid cake are far smaller than those in the filter medium, thereby enabling the removal of some very substantial proportion of the suspended particles. The portion removed will, of course, be a function of the size and nature of the particles to be filtered and the porosity and inherent clarifying ability of the particular filter aid. This technique is to be distinguished from the pretreatment-bed filtration as all of the liquid with its suspended solids is introduced into the filter.

In order to increase the intitial efficiency of the filter aid filtering process, a precoat of filter aid particles is provided on the filter septum in addition to the incorporation of particles within the liquid., This also keeps the main filter cake containing the impurities from coming into direct contact with the filter medium and consequently prevents the gummy particles from clogging the medium and lessening the filtration efficiency in the manner mentioned above.

The materials most generally used as filter aids are diatomaceous silica, perlite, other siliceous materials, carbon, and fibrous matter such as asbestos and cellulose.

However, even with the use of filter aids, some difficulty remains due to the fact that too frequently water supplies or waste water streams contain materials too finely divided or color ingredients which are too difficult to remove by the use of filter aids having a porosity great enough to obtain an economical filtration rate.

To retrace briefly the early efforts made in this area, initial attempts proceeded along the same theory as advocated by Weisgerber and Clemens regarding the electric charge of the contaminants. Such may be evidenced by the Frankenhoff U.S. Letters Patent Nos. 2,468,188 and 2,468,189. The substance of this technique was a method requiring the substantially simultaneous addition to the water of the filter aid and a floc former in the form of water-soluble salts of particular trivalent metals. Utilizing prescribed limits, the salt was to be converted to a hydrate state solely through the effects of the natural alkalinity of the water medium, and it was thought that it becomes coated upon the filter aid particles. All too frequently the above processes have not worked satisfactorily, either because of incomplete precipitation of the metallic hydrate with consequential contamination of the filtered product, or because of high rates of head loss-increase resulting in filter cycles so short as to be economically and operationally impractical. Consequently, very little advance has been made in the filter aid filtration of water as a result of the Frankenhoff patents.

More recently, it has been found that, contrary to the previous teachings, and perhaps the reason for the failure of the early attempt, the coating may be effected upon a filter aid surface only if, prior to effecting the formation of the hydroxide through the proper chemical reaction, the filter aid particles to be coated are first placed in suspension in such amounts so as to constitute at least 0.25 percent by weight in the medium and thereafter effect the precipitation to obtain the coated filter aid. That is, only with filter aid concentrations of 0.25 percent by weight or more will a coating be insured upon the filter aid. Once the coating has been formed, the concentration may be appropriately reduced to as little as 0.001 percent or less without any loss in effectiveness. U.S. Letters Patent application Serial No. 118,276, filed June 20, 1961, assigned to the instant assignee, illustrates this process.

However, even with this recent advancement, difficulty in completely and effectively removing some types of turbidity and colloidal color from water or waste water supplies has persisted. It has now been discovered that such removal may be efficaciously carried out. It has been determined that substantial and economical turbidity and color removal may be effected by employing a preconditioning technique in conjunction with filter aid filtration. Briefly, a cationic polyelectrolyte is first uniformly dispersed in the color- and turbidity-laden water, floc former and filter aid introduced into the water and thereafter the floc former precipitated solely as a coating on the filter aid. Subsequently, the water is filtered through any filter aid filter to effect substantially complete removal of the aforementioned impurities.

It is important to note here that this water is directly passed to the filter without necessitating the use of any detention or settling steps, such as those associated with pretreatment or sand filters. The amount of turbidity and color in the filtered water may be reduced to 5 A.P.H.A. silica units and 15 p.p.m. on the platinum-cobalt scale, or much lower, respectively, which equals or is better than the currently recommended standards of the U.S. Public Health Service.

OBJECTS

It was accordingly a principal object of this invention to provide a more practical means whereby the deficiencies of the foregoing filtration processes were overcome.

It was a further object of this invention to provide a method for clarifying and substantially purifying water supplies wherein maximum effectiveness is achieved as to the removal of turbidity, color and other impurities.

It was another object of this invention to provide a new and novel and more practical method of introducing the necessary ingredients into waste water or water supplies to be treated so as to increase the effectiveness of the additives with regard to the clarification and purification of the water supplies by the removal of impurities therefrom.

It was another object of this invention to provide a practical means of purifying contaminated water sources to render them potable.

Additional objects and further scope of applicability of the present invention will become apparent in the detailed description given hereinafter, the preferred embodiment of which has been illustrated in the accompanying drawing by way of example only wherein:

FIGURE 1 is a schematic view of the preconditioning and filtration equipment used in carrying out the instant invention.

DETAILED DESCRIPTION OF THE INVENTION

It has now been determined that the foregoing objects may be satisfied and the above-mentioned problems overcome by providing a novel method of treating the turbidity and color laden water supplies. It has been discovered that by utilizing a new concept of "preconditioning," the contaminants may be effectively removed by filter aid filtration as outlined above.

Specifically, it has been determined that substantial and economical turbidity and color removal may be achieved by employing a step of preconditioning the water to be filtered in a filter aid filtration process, to insure a coating of floc-former upon the filter aid. In order to accomplish this, the water is first treated with a specific class of polyelectrolytes, and more particularly the branch chain cationic polyelectrolytes, in such a way as to insure complete distribution of the polyelectrolyte in a given volume of water, as by employing a mixing tank and a means of vigorous agitation, or by employing some other device such as a centrifugal pump. The floc-former alone or in combination with the filter aid, may be added at the same time as the polyelectrolyte or these ingredients may be subsequently added separately. Upon insuring the complete distribution of the polyelectrolyte and addition of the other two ingredients, the degree of agitation is reduced to permit the formation of a coating.

It is to be understood that regardless of the timing of the addition of the filter aid, either with the other ingredients or subsequently, it must be present when the coating is being formed in order to provide a base for the precipitate. In other words, the filter aid must be present at the time of incipient floc formation. It is only when the agitation is reduced that coating formation is achieved with the resultant precipitant as a coating on the filter aid. This coating contains in addition to the flocculant, turbidity and color as inclusions therein. The resultant coated filter aid can then be removed by any filter aid filter technique. The formation of the coating should be controlled so that all or substantially all the floc formed is precipitated as the coating. However, it should be understood that there may be a nominal amount of actual floc formed which is not precipitated as a coating.

The floc-former may be selected from soluble inorganic hydroxides or salts of trivalent or tetravalent metal such as chromium, thorium, iron or aluminum with the latter two being preferred. The hydroxyl compounds are preferred. As with all the ingredients, the amount to be used is dependent on the character of the water being treated and the impurities to be removed. However, between 10 and 400 p.p.m. floc-former will generally be adequate with between 20 and 200 p.p.m. being preferred.

The cationic polyelectrolyte as employed herein may be defined as organic substances having reoccurring ionizable groups wherein the cations are chemically linked, and the anions are freely mobile. The group is intended to include among others, the substituted ammonium salts, i.e., including one or more of the characteristic groups primary, secondary (including imines) and tertiary amines, quaternary ammonium and sulfonium salts and may be represented by those set forth in U.S. Letters Patent Nos. 2,831,841, 2,909,508, and 2,995,512 mentioned above, whose disclosures are incorporated herein by reference.

One such material found particularly useful is a hydrophilic alkylene polyamine polyfunctional halohydrin polymer resulting from the condensation of an alkylene polyamine and a polyfunctional halohydrin as aqueous solutions to a thicker condition short of gel formation and sold under the trademark of Nalco 600. Another is a branch chain polyelectrolyte containing sulfonium active groups and sold under the trademark Ucar C-149. U.S. Letters Patent Nos. 2,469,683 and 2,543,666 also disclose operable cationic polyelectrolytes and their disclosures are also incorporated herein by reference. Other branch chain cationic polyelectrolytes are known in the art. It has been determined that between 0.001 and 10 p.p.m. will be sufficient for most water treatment with between 0.1 and 3 p.p.m. preferred.

The filter aid used in the body feed may be any one of the commercially available filter aids such as the diatomaceous silica, expanded perlite, or other filter aids or mixtures of the same. The amount of filter aid added is also dictated by the liquid being treated and the desired result but may be varied between 10 and 400 p.p.m. with between 20 and 200 being preferred.

With continuing reference to the accompanying drawing wherein like reference numerals designate similar parts throughout, this invention may be utilized in the following manner. Water, from a source such as a river, lake, pond or well 10, is drawn from by a centrifugal pump 12 and passed to an aerating tower 14 or alternatively directly into a preconditioning tank 16. If the water is first passed to the aerating tower it is then directly discharged into the preconditioning tank. Three feeding devices, 18, 19 and 20, are mounted above the tank 16 and permit the feeding of the polyelectrolyte, floc former and filter aid, respectively. Upon uniformly dispersing the polyelectrolyte, the floc former and filter aid are introduced into the tank, pin point flocs formed, and precipitated as a coating upon the filter aid. The contents are preferably retained under just sufficient agitation to keep all solids suspended, as by agitator 22, for up to 10 minutes. The preconditioned water is then pumped by pump 24 to a commercial filter unit 26, with sufficient pressure to overcome both the resistance of the filter itself and the gradually increasing resistance of the accumulating filter cake. From the filter the water is pumped to end use 28. The filter is also provided with a precoat supply 30, to feed precoat filter aid to the filter.

A more complete understanding of the invention will become apparent from the following examples of the operations within the scope of the invention.

EXAMPLES I–XXI

A supply of water clear to the eye but yellow in color, having approximately 160 p.p.m. color based on the A.P.H.A. platinum-cobalt scale, was used as a means of assaying the effectiveness of the process components using a so-called jar test. The general procedure used was as follows: To a 500 ml. volume of the test water were added various amounts of the branch chain cationic polyelectrolyte, floc former and filter aid. Limestone was used for pH adjustment since this water had relatively little natural alkalinity. The resultant mixture was mechanically stirred at 60 to 75 r.p.m. for about one minute to uniformly disperse the polyelectrolyte after which the rate of stirring was reduced to about 15 r.p.m. for nine minutes more. This permitted precipitation of the coating on the filter aid. A portion of the treated water was then filtered immediately through a Whatman #5 filter paper on a Büchner suction filter and the A.P.H.A. color determined. The reagents used were between 20 and 100 p.p.m. alum as the floc former, between 60 and 100 p.p.m. diatomaceous silica filter aid and between 0.5 and 3 p.p.m. polyelectrolyte using both the sulfonium active polymers and the alkylene polyamine polyfunctional halohydrin polymers.

The effect of varying the alum level was as noted below in Table 1 using 100 p.p.m. filter aid, 2 p.p.m. polyamine polymer and a pH of 7.5 to 8.

*Table 1*

| P.p.m. alum: | Final color |
|---|---|
| 30 | 90 |
| 40 | 70 |
| 50 | 45 |
| 60 | 20 |
| 70 | 30 |
| 80 | 35 |
| 90 | 45 |
| 100 | 45 |

Once having established the optimum alum level at 60 p.p.m. the effect of varying the polyelectrolyte level under these conditions is shown below in Table 2.

Table 2

P.p.m. polyelectrolyte: | Final color
--- | ---
0.5 | 140
1.0 | 45
1.5 | 30
2.0 | 20
2.5 | 35
3.0 | 35

The effects of clay, limestone, diatomaceous silica were also determined under the optimum conditions, using 60 p.p.m. alum and 2 p.p.m. polyelectrolyte. The results are as listed below in Table 3.

Table 3

| Floc Weighter | Polyelectrolyte, p.p.m. | Color |
|---|---|---|
| None | 2 | 110 |
| 100 p.p.m. limestone | 2 | 65 |
| 100 p.p.m. diatomaceous silica | 2 | 20 |
| 200 p.p.m. diatomaceous silica | 2 | 30 |
| 100 p.p.m. Clay | 2 | 65 |
| 100 p.p.m. Clay | 2 | 30 |

This established that the use of polyelectrolyte and diatomaceous silica in optimum proportions gave the best results.

EXAMPLES XXII–XXIV

A source of water having unusually finely divided turbidity underlain with an almost invisible color content ranging up to 200 p.p.m. and typically over 100 p.p.m. was treated. While this water could be effectively clarified and decolorized by pretreatment, including settling and rapid sand filtration, the cost of so doing is such as to warrant a search for more economic means. None of the other foregoing described prior art would do the job effectively and economically.

Using an equipment chain similar to that shown in FIGURE 1, the above described preconditioning technique was adapted to this water source. The results are set forth below in Table 4.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What we claim is:

1. A method of removing impurities such as turbidity and color from water comprising preconditioning the water by adding thereto between 0.001 and 10 p.p.m. organic branch chain cationic polyelectrolyte, between 10 and 400 p.p.m. of a floc former selected from the group consisting of salts of a trivalent metal, salts of a tetravalent metal and mixtures thereof and between 10 and 400 p.p.m. filter aid particles under condition of agitation to effect a suspension of the particles and coating of substantially all of the floc former upon the filter aid whereby the impurities are incorporated along with the coating thereon, and filtering said water containing said particles through a filter aid filter medium.

2. A method as defined in claim 1 wherein the ingredients are added simultaneously under conditions of high agitation to insure uniform distribution and the agitation reduced, while still maintaining the particles in suspension, to permit precipitation of the floc former as a coating on said filter aid.

3. A method as defined in claim 1 wherein the water is passed into a retention area and said polyelectrolyte is first added to said water under high agitation to insure uniform distribution thereof throughout said water and the floc former and filter aid are subsequently added and after the addition of the filter aid the agitation is reduced to a point to permit precipitation of the floc former as a coating on the filter aid.

4. A method as defined in claim 1 wherein the polyelectrolyte is added in amount between 0.1 and 3 p.p.m., Table 4

SUMMARY OF FILTRATION RESULTS: BAKER SPIN-TYPE 20 SQ. FT. POOL FILTER WITH 4.6 SQ. FT. TOTAL AREA. ESTIMATED TANK VOL. AT 1 G.S.F.M. APPROX. 5 MIN. PRECOAT OF 0.1 LB./SQ. FT. APPLIED FROM SLURRY BY RECIRCULATION

| | Example | | |
|---|---|---|---|
| | XXII | XXIII | XXIV |
| Precoat, 0.1 lb./ft.² | Alum and diatomaceous silica. | Alum and diatomaceous silica. | Diatomaceous silica and asbestos fibers. |
| Pre-Conditioner | Alkylene polyamine polyfunctional halohydrin polymer. | Sulfonium active polymer. | Alkylene polyamine polyfunctional halohydrin polymer. |
| Body Feed, p.p.m.: | | | |
| Filter aid | 125 | 115 | 139. |
| Al(OH)₃ | 2.5 | 2.3 | 2.8. |
| Polyelectrolyte | 0.125 | .23 | 3.6 pre-fed. |
| Filtration Rate, g.p.m. | 2.2 | 2.3 | 1.8. |
| Head Loss Increase: | | | |
| Δ P/hr | 0.0 | 6.0 | 5.5. |
| Hrs | 1.0 | 1.5 | 1.3. |
| Turbidity (Silica Units): | | | |
| Raw | 40 | 40 | 50. |
| Filtered ¹ | 20 (1.0) | 13 (1.5) | <1.0 (1.25). |
| Color: | | | |
| Raw | 80 | 80 | 70. |
| Filtered ¹ | 58 (1.0) | 15 (.25) | 13 (.75). |

¹ Parentheses ( ) denote elapsed time in hours at sampling.

These data, coupled with the knowledge of the art regarding the ability or more appropriately the inability, of filter aid alone, floc formers alone, or a combination to remove only a very little amount and with extremely high head losses demonstrate the significance of the instant invention.

the floc former between 20 and 200 p.p.m. and filter aid between 20 and 200 p.p.m.

5. A method as defined in claim 1 wherein the filter aid is selected from the group consisting of diatomaceous silica, perlite, and mixtures thereof.

6. A method as defined in claim 1 wherein the polyelectrolyte is selected from the group consisting of primary, secondary and tertiary amines, quaternary ammonium, sulfonium salts and mixtures thereof.

7. A method as defined in claim 6 wherein the polyelectrolyte is a hydrophilic alkylene polyamine polyfunctional halohydrin polymer.

8. A method as defined in claim 6 wherein the polyelectrolyte is a sulfonium active group containing material.

9. A composition of matter consisting essentially of a mixture of between 0.001 and 10 parts by weight organic branch chain cationic polyelectrolyte, 10 and 400 parts floc former selected from the group consisting of trivalent metal inorganic compounds, tetravalent metal inorganic compounds, and mixtures thereof, and 10 and 400 parts filter aid.

10. A composition of matter as defined in claim 9 wherein the floc former is present in an amount between 20 and 200 parts and is selected from the group consisting of trivalent metal inorganic compounds, tetravalent metal inorganic compounds and mixtures thereof.

11. A composition of matter as defined in claim 9 wherein the filter aid is present in an amount between 20 and 200 parts and is selected from the group consisting of diatomaceous silica, perlite, and mixtures thereof.

12. A composition of matter as defined in claim 9 wherein the polyelectrolyte is present in an amount between 0.1 and 3 parts and selected from the group consisting of primary, secondary and tertiary amines, quaternary ammonium, sulfonium salts and mixtures thereof.

13. A composition of matter as defined in claim 12 wherein the polyelectrolyte is a hydrophilic alkylene polyamine polyfunctional halohydrin polymer.

14. A composition of matter as defined in claim 12 wherein the polyelectrolyte is a sulfonium active group containing material.

References Cited by the Examiner
UNITED STATES PATENTS

| | | | |
|---|---|---|---|
| 2,236,930 | 4/1941 | Uytenbogaart. | |
| 2,468,189 | 4/1949 | Frankenhoff | 210—75 |
| 2,764,512 | 9/1956 | Wilson | 210—24 X |
| 2,941,942 | 6/1960 | Dahlstrom et al. | 210—53 |
| 2,995,512 | 8/1961 | Weidner et al. | 210—54 |
| 3,142,638 | 7/1964 | Blaisdell et al. | 210—54 X |

FOREIGN PATENTS

| | | |
|---|---|---|
| 607,440 | 10/1960 | Canada. |
| 826,770 | 1/1960 | Great Britain. |

OTHER REFERENCES

"Polysaccharide Chemistry," Whistler et al., 1953, Academic Press Inc., N.Y., pp. 161–201 relied on.

Conley et al.: Innovations in Water Clarification, Jour. AWWA, October 1960, vol. 52, pp. 1319–1325.

MORRIS O. WOLK, *Primary Examiner.*